US008554772B2

(12) United States Patent
Ayars et al.

(10) Patent No.: US 8,554,772 B2
(45) Date of Patent: Oct. 8, 2013

(54) DEFERRING CLASSIFICATION OF A DECLARED RECORD

(75) Inventors: Frank R. Ayars, Corona, CA (US); Yi-Jen Lin, Huntington Beach, CA (US); Yvonne W. Santiago, Lake Forest, CA (US); Li Zhou, Irvine, CA (US)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 12/718,470

(22) Filed: Mar. 5, 2010

(65) Prior Publication Data
US 2011/0218995 A1  Sep. 8, 2011

(51) Int. Cl.
*G06F 7/00* (2006.01)
*G06F 17/30* (2006.01)
*G06F 15/16* (2006.01)

(52) U.S. Cl.
USPC .......................................... 707/740; 707/812

(58) Field of Classification Search
USPC .......................................... 707/740, 737, 812
See application file for complete search history.

(56) References Cited

U.S. PATENT DOCUMENTS

| 7,233,959 | B2 | 6/2007 | Kanellos et al. |
| 7,647,335 | B1* | 1/2010 | Colecchia ................ 707/102 |
| 2003/0182304 | A1* | 9/2003 | Summerlin et al. ....... 707/102 |
| 2006/0218201 | A1 | 9/2006 | Hsu et al. |
| 2006/0230044 | A1* | 10/2006 | Utiger ....................... 707/10 |
| 2007/0088736 | A1 | 4/2007 | DeBie |
| 2007/0150445 | A1 | 6/2007 | DeBie |
| 2007/0271308 | A1 | 11/2007 | Bentley et al. |
| 2008/0086506 | A1* | 4/2008 | DeBie et al. ............. 707/104.1 |
| 2008/0154969 | A1* | 6/2008 | DeBie ...................... 707/200 |
| 2008/0177790 | A1 | 7/2008 | Honwad |
| 2009/0106155 | A1 | 4/2009 | Castellanos et al. |
| 2009/0187602 | A1 | 7/2009 | Chen et al. |
| 2011/0153515 | A1* | 6/2011 | Pitzo et al. .............. 707/737 |
| 2012/0191711 | A1 | 7/2012 | Ayars et al. |

OTHER PUBLICATIONS

Hong, T., et al., "Maintenance of Fast Updated Frequent Pattern Trees for Record Modification," Proc. of 1st Int'l. Conf. on Innovative Computing, Information and Controls (ICICIC '06), 2006.
Lin, C., et al., "Maintaining the Fast Updated FP-tree from Modified Records Based on Pre-large Itemsets," IEEE, 2007.

* cited by examiner

*Primary Examiner* — Greta Robinson
*Assistant Examiner* — Brian E. Weinrich
(74) *Attorney, Agent, or Firm* — Terry J. Carroll; SVL IP Law Edell, Shapiro & Finnan, LLC

(57) ABSTRACT

A records management system classifies records according to a file plan. Record are declared, and then classified. Some records have in initially indeterminate classification and classification is deferred, either by request or due to a lack of sufficient information to classify the record according to the file plan. Unclassified records are placed into a temporary container. At some time while in the temporary container a classification event occurs with a given record which allows the records management system to classify the record and place it into a container corresponding to its classification.

12 Claims, 4 Drawing Sheets

DEFERRING CLASSIFICATION OF A DECLARED RECORD

BACKGROUND

The present invention relates to records management systems, and more particularly to records declaration without sufficient information to classify the record for disposition.

Businesses and other organizations produce and receive large amounts of documents. These documents pertain to many different kinds of information and originate from numerous sources, both internal to the organization and from external sources. Quite often these documents meet the criteria of being a record. A record contains evidence of the business' or organization's activity and allows the organization to track activity and provide proof of activity for commercial, legal, and other purposes. Records are maintained according to records policies. A record policy indicates, for example, how a record is to be used, who can access a record, who can modify a record, when a record is ready for storage, security classification, retention schedules, and where a record must be kept, as well as destruction criteria.

The process of identifying records among the documents in an organization varies. A document gains record status by being "declared" as a record. Some documents are records upon being created, other documents may exist in the organization for an indefinite time until they gain sufficient information or usage that they can be declared and classified as a record. A document is conventionally declared when it can be classified according to an organization's file plan. A file plan includes a collection of records policies that allow the records management system to classify a given document into a record classification. Some documents are classified as records upon creation, such as email. Other documents become records due to being received from outside the organization in the course of the organization's activities, such as purchase orders, invoices, statements, utility bills, legal documents, and so on.

The conventional approach to records declaration, which requires a document to meet a records classification criteria prior to being declared a record, prevents some documents from being declared records that an organization might desire to treat as records, because the documents are not classifiable to a particular record class. Therefore there is a need for a record management system that allows a record to be declared without having to classify the record upon declaration.

BRIEF SUMMARY

Embodiments of the invention include a computer implemented method, computer program product, and records management system that identifies a document as a record candidate, declares the document to be a record having an indeterminate classification, places the record in a temporary container until a classification event associated with the record occurs, such that the record is available for use by an application associated with the record and determines a classification of the record based on the classification event. Once a classification is determined the record is placed in a record container corresponding to the classification.

In another embodiment a record is declared, classification of the record is deferred and the unclassified record is placed into a temporary container. While in the temporary container, a classification event may occur in relation to the record which allows the record to be classified, whereupon the record is then so classified and placed into a record container corresponding with the classification.

Embodiments of the invention further include a method and a computer program product for delaying classification of records in an information system. The computer program product and method automatically declare a plurality of documents created in the information system to be records, place records in an unclassified records container of a file plan repository of the information system, determine the occurrence of a classification event associated with at least one of the plurality of documents, and in response to the occurrence of the classification event, determine a record classification of at least one of the plurality of documents. Upon determining the record classification of the at least one of the plurality of documents, a record associated with the document is moved to a classification container of the file plan repository.

DETAILED DESCRIPTION

Figure 1:
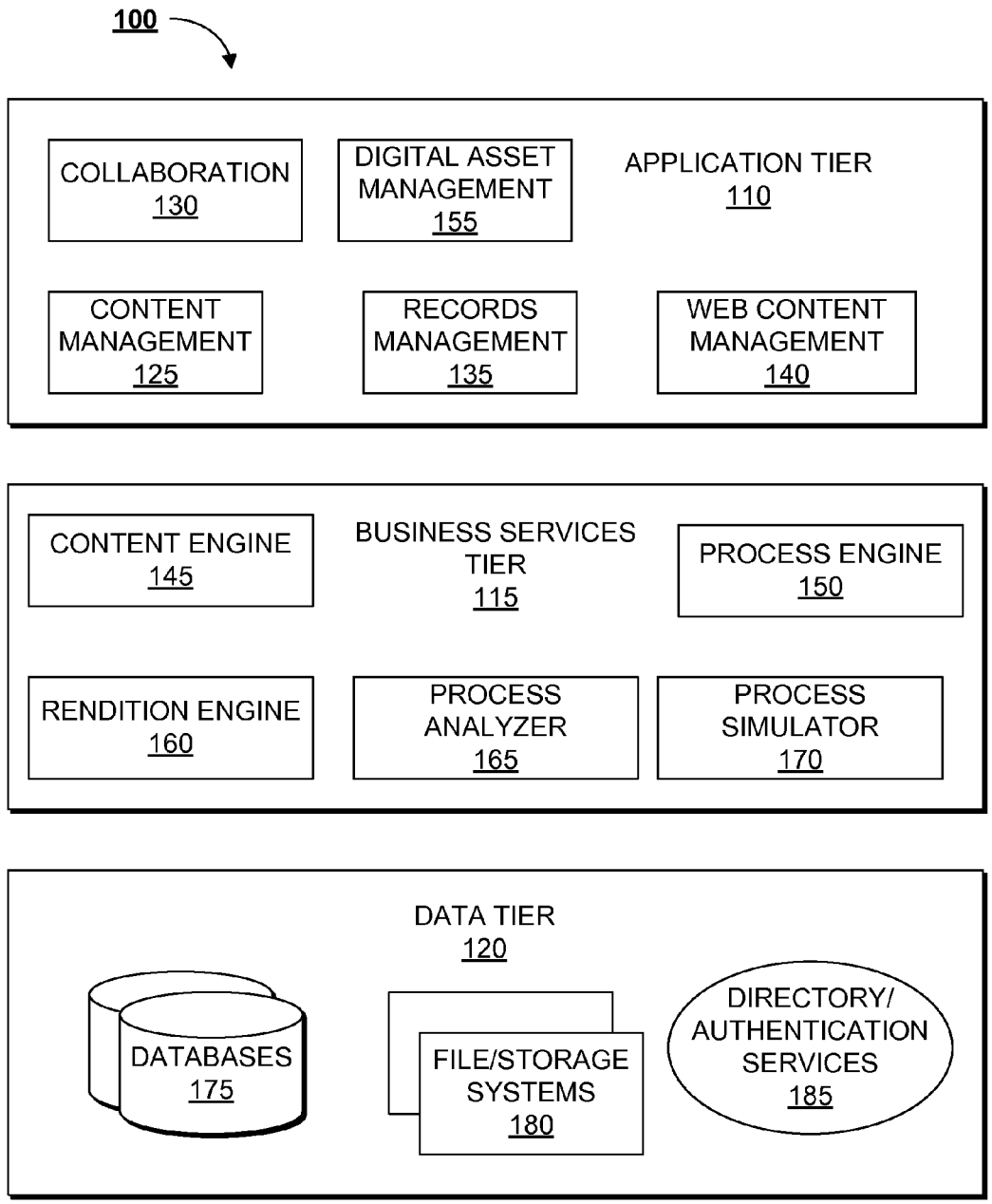
FIG. 1 is an architecture diagram of a content management system including a records management system, in accordance with an embodiment of the invention.

The present invention discloses a solution for the problem of determining that a document should be a record before a record classification can be determined, by declaring the document to be a record and holding the record in a temporary container until a classification event occurs with the record that allows the record management system to classify the record and put it into an appropriate records container.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, which shows the general architecture for a Content Management System (CMS) illustrated as a block diagram 100 representation of an architecture of a content management system. The CMS includes an application tier 110, a business services tier 115, and a data tier 120. A single architecture may be provided thereby for content management 125, records management 135, web content management 140, collaboration 130, and digital asset management 155 at the application tier, while a content engine 145 and a process engine 150 are used to manage the content and processes for all the separate functions indicated as content management 125, records management 135, web content management 140, collaboration 130 and digital asset management 155. The business services tier 115 further includes a rendition engine 160, process analyzer 165 and process simulator 170. The rendition engine controls and manages the display of graphics object produced by the CMS. The process analyzer 165 tracks processes undertaken by the CMS. The process simulator 170 allows users of the CMS to develop processes to be used in the CMS. The data tier 120 includes databases 175, file and storage systems 180, and directory and authentication services 185. The databases 175 include physical media where records and documents can be stored. The file and storage systems 180 specify the organization of files in the CMS. The directory and authentication services 185 control and manage access to various content in the CMS. One of ordinary skill will recognize that this architecture is exemplary in nature and its logical functions may be re-arranged without departing from the scope of the present invention.

Using this architecture, system events can trigger actions in any part of the system. When content is added to the system, events may publish the content to the web or declare it as a record. In this manner, a file plan may be populated with record information within the system, and content may be managed both inside and outside the system.

The records management system 135, the process engine 150, the content engine 145, and the data tier 120 shown in FIG. 1 may be configured to monitor the value(s) of one or more events or actions associated with one or more of the data objects associated with records or the file plan. In response to this monitoring, and based on one or more pre-defined rules, policies, and/or conditions, the records management system 135 may be configured to automatically initiate one or more processes in the process engine system 150. For example, after user declaration of an asset as a record, or upon automatic identification of a digital document or asset as a record, the system may automatically classify one or more of the records in a conventional manner, or store information associated with one or more of these records in the records management system. One or more of these processes may in addition or instead apply one or more pre-defined retention periods or disposition rules to one or more of the records.

However, according to an embodiment of the invention, the system may also defer classification of the record, and wait until some future event occurs which allows classification. The system thereby handles a document as a record, giving it protections and security as is appropriate, while the classification is pending. This avoids situations where, under a conventional records management system, a record is not declared until it can be classified.

One or more of the various management systems may be separate, stand-alone systems that have been brought together and integrated merely for the purpose of creating the records management system. The records management application may be accessed by a user, whether a regular end user, records administrator, records manager or reviewer (privileged user) over a Java-based API that indicates the pertinent records management operation that the user can perform. These operations may include a declaration API, a record management API, a disposition API and a file plan management API. The APIs may incorporate XML technology for ease of use, as well as ease of import and export of information in the records management system.

The records management system described herein may be used to declare, defer classification, classify, and manage records of different types, secure repositories that contain records, create retention and disposition rules for records, control access to records, retrieve records based on search criteria, destroy records that are no longer used, review vital records, and add records with minimal user intervention.

Record declaration may be performed when a potential record is added to the system. In the case of electronic content, declaration can occur conventionally when a document is created or published, or upon the creation of a new document version, or when an e-mail is transmitted. For electronic documents as well as other types of records, the records may be automatically declared based on other, prior user input or business context. Some documents, however, may not meet the conventional requirements for being declared a record because they lack sufficient information for classification into a record category. In accordance with an embodiment of the invention, however, a record may be declared and classification deferred until more information is added to the record, or some other classification event occurs. In the case of a physical artifact, declaration may occur, for example, when the physical artifact is received by a company, as indicated by an appropriate user. Records may also be generated in a variety of other uses and applications, e.g., part of a transaction, or during the course of a process. Process-centric records may be created as part of a company's line of business.

Advantageously, the records are organized according to some hierarchy often referred to as a file plan that contains an organized arrangement of data containers used to store records. Typically, a disposition schedule is associated with the different data or records containers that define the retention policy related to records stored in that particular data container. A single person, such as a records administrator, may be charged with responsibilities for designing a classification scheme, including a classification deferral scheme, defining a new file plan, configuring naming patterns and phases, as well as defining and modifying disposition schedules. Major categories of the file plan may be category hierarchy and disposition schedules.

Figure 2:
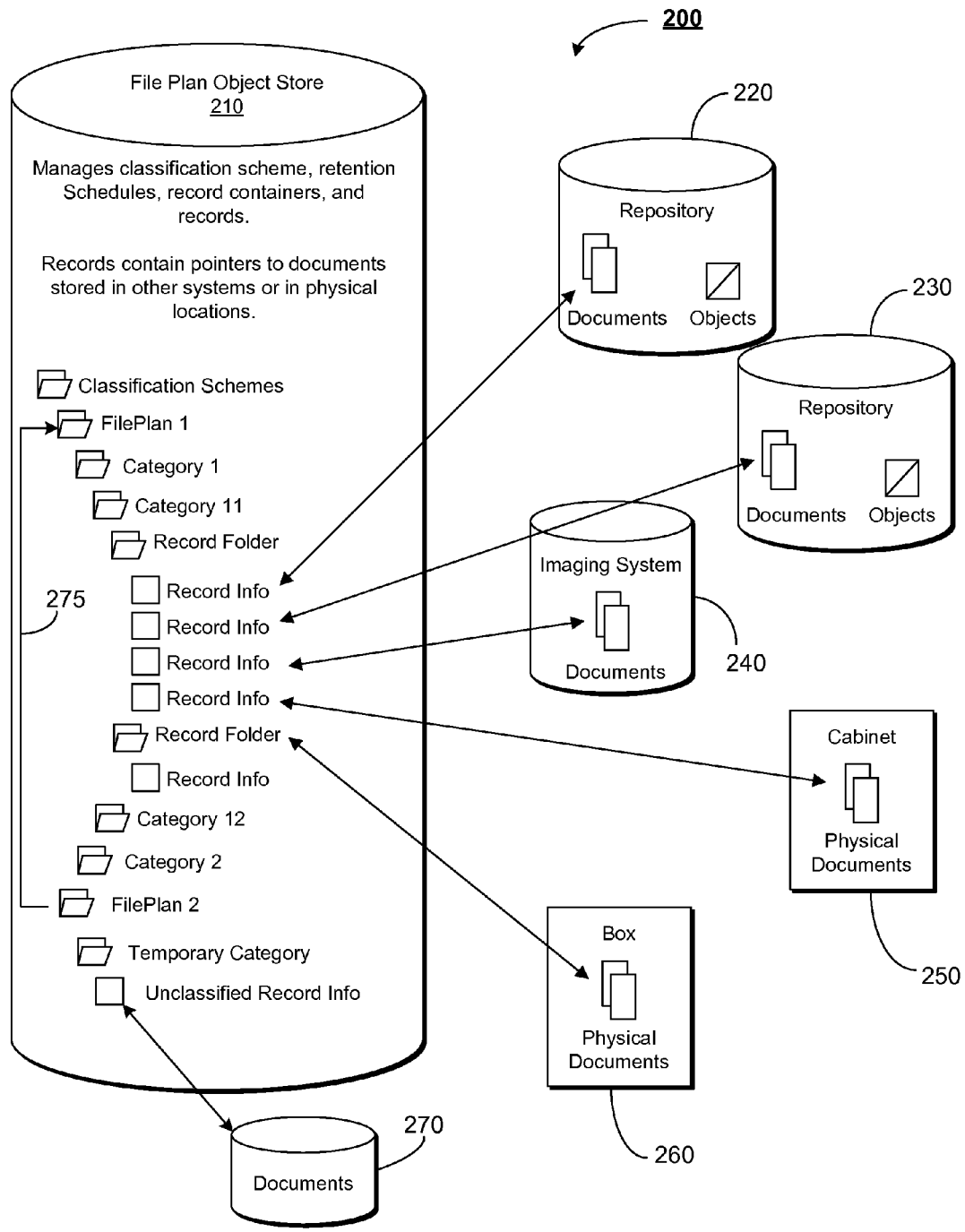
FIG. 2 is a file plan model of a records management system, in accordance with an embodiment of the invention.

Referring now to FIG. 2, illustrated is one embodiment of a data model 200 that can be used for a file plan in accordance with the present disclosure. In this illustration, the file plan is used to manage records across object stores and repositories. As illustrated, the file plan uses a file plan object store 210 which manages classification schemes, retention schedules, record containers, and records. The records stored in the file plan object store 210 contain pointers to documents stored in other systems or in physical locations. This file plan object store also incorporates a category hierarchy which may be the primary classification for records, and may include categories, as well as various types of folders and corresponding volumes. More particularly, the file plan may incorporate a classification scheme, record category, record folder, record part or record type that can be used to manage the record.

The category hierarchy may also include a tree structure defining how records are organized, and the category hierarchy may also propagate security and support disposition schedules. The category hierarchy may include a flexible hierarchical structure that is designed to fit the unique needs of an organization. For example, a top level may be "Accounting" with sublevels of "AR" and "AP." Another top level may be "HR" with sublevels of "Policy" and "Resumes." The category hierarchy may determine the scheme for classifying records in combination with events or business context so that the records may be automatically classified by a records management system, without user intervention.

The category hierarchy may be determined by business function. For example, a category hierarchy may be organized according to a function/activity/transaction model wherein the first level determines functional groupings, the second level determines activities within the function, and the lowest level represents a transaction. The hierarchy may also be designed to facilitate access. In this manner, security may be more easily controlled, user access in terms of browsing may provide better performance and the hierarchy may facilitate aggregation for purposes of disposition.

Alternatively to file plan design based on business function, a file plan may be designed so that each folder in the category is a client file that contains that particular client's records, and once the client folder is closed, cutoff may be triggered so that active use of the record ends and it begins its retention period.

As yet another alternative to file plan design based on business function, a file plan may be designed so that different types of records are filed into different folders. As yet another alternative, the file plan may be designed so that each subcategory represents a project, and each project may have a collection of folders to manage different records related to the project. An external event related to a project milestone may be used to trigger cutoff so that active use of the record ends and the retention period begins.

The record category may be added to the root of the file plan. The record category may also be added as a subcategory to an existing category to establish a hierarchy. The required properties of a category may be the category name which may be descriptive of the category, the category identifier which may be a more cryptic string identifier often containing a numeric code, and a reviewer which may default to the user who is adding the category.

A record folder may be added to a category. Conceptually, the record folder may be the most common level for managing records. The required properties for a folder may include the folder class such as a content engine object class defining the type of folder. The folder class may be defined by the data model. The folder properties may also include a name, identifier and reviewer much like the record category.

Generally, a record folder may not contain sub-folders, but may contain volumes. The first volume may be automatically added when the record folder is created, and a name may be automatically generated based on the folder name. When a new volume is added, the previous volume may be automatically closed. Volumes may be used to partition groups of records, whether similar or not. For example, a record folder may contain all invoices while volumes may be used to partition by month. A volume may be required to include a reviewer, which may default to the user requesting the volume.

As shown in FIG. 2, the data objects and physical repositories 220, 230, 240, 250, 260 may be configured in conformance with the classic model of a software object that has been developed in object-oriented programming to include one or more attributes and one or more methods.

A broad variety of characteristics may be assigned as attributes to the file plan object 210, object stores 220, 230 and other objects. For example, these objects may incorporate attributes that are related to the records that are embodied in the software object such as a name for the record, a description of the record, the type of record, an identification of the holders of the record. Audit information may also be contained as an attribute relating to the record such as who accesses an object, when it is modified, who authorizes the modification, who generates documentation related to the object or repository, and when these events take place. Electronic signatures that may have been procured in connection with an object store such as object stores 210, 220, 230 may be contained as an attribute. Notifications that should be issued upon a change in an aspect of a data object, security information relating to a data object, status information that is associated with the record (such as lost item), relevant dates (e.g., creation date, expiry date, and/or key timelines, including multiple, periodic or cyclical information), and relationships between the record software object and other components may be contained as attributes.

Although each of these characteristics may be illustrated as an attribute of the object, each of these may also or instead be stored as separate components or objects in the record management system.

The data model 200 includes pointers from the file plan object store 210 to documents stored in other systems or locations. One such pointer is to object stores related to documents 220, 230 which are the main record types and thus use more space. The data model also includes pointers to an image service repository 240, a cabinet repository for physical documents 250 that may be located in cabinets, as well as a box repository for physical documents 260 that may be located in boxes. These records are all classified under one particular file plan, which may be one of several or many file plans employed by the organization. The file plan may be used to classify a record upon declaration of the record in a conventional manner, or it can be used to classify a record that was declared with deferred classification, in accordance with embodiments of the invention. A second file plan can be used to point to documents 270 which have been declared as records, but not yet given any record classification under the file plan. Although shown here in one instance, the records designated in container 270 may be in any of repositories 220, 230, 240, 250, and 260, or elsewhere. The declared but unclassified records may move to another file plan, as indicated by line 275, upon the occurrence of a classification event where, for example, additional information is added to the record, allowing it to be classified into another file plan. This design provides for a file plan that incorporates an intuitive scheme that can be readily used by the records administrator to generate a file plan. Based on this user-friendly structure, a records administrator may customize the file plan to fit the company's needs.

Methods may be related to the records, including methods that include or relate to retention and disposition rules, timed events, notifications, reports and trends and forecasts. Each of these methods may constitute software subroutines that initiate, alter or interrupt one or more processes. As with the attributes, the methods may be stored separately from the file plan object store or data object in another object or component.

Figure 3:
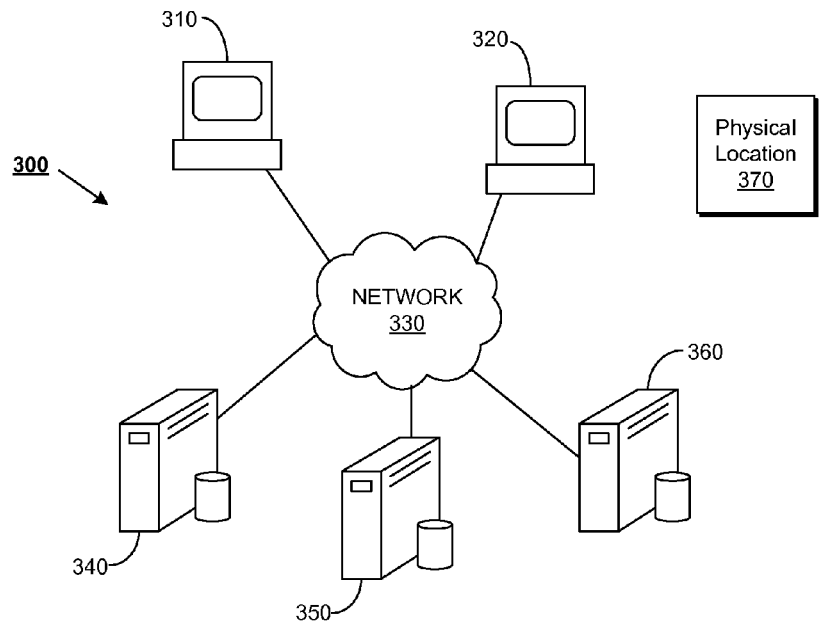
FIG. 3 is an enterprise or organization network including a records management system, in accordance with an embodiment of the invention.

FIG. 3 shows an enterprise or organization network 300 including a records management system, in accordance with an embodiment of the invention. The network of FIG. 3 may be used, for example, to implement the architecture of FIG. 1. The architecture of FIG. 1 may be implemented on a variety of programmable computer platforms. Such a computer processing system or platform may include a single computer or multiple computers and/or processors. When using multiple computers and/or processors, the multiple computers and/or processors may be at a single location or at several locations. When using multiple computers and/or processors, the multiple computers and/or processors may be interconnected by a network system such as a local area network, a wide area network, and/or the Internet. Within such computer platforms are typically memory systems that may include any type of memory system, including one or more hard disk drives, magnetic tape drives and/or RAMs. The memory system may consist of a single device or multiple devices. When multiple devices are used, they may all be located in close proximity to each other, or at different locations. When multiple devices are used, appropriate hardware and/or software may be used to facilitate their intercommunication.

The records management systems, methods and computer program product are designed to manage records of various types, including but not limited to, electronic documents and e-mails, physical records or artifacts, vital records and permanent records. A record can be any information asset that an organization desires to maintain and manage in a reliable manner.

The enterprise network of FIG. 3 includes client terminals 310, 320 which may be workstations comprised of conventional desktop or laptop computers running know operating systems and having client applications and other applications for generating, editing, and sending documents locally and remotely. The client terminals may be used by personnel and others associated with an organization operating the network 300. The client terminals 310, 320 may be coupled to a network 330 which may be an IP-based network, which is further connected to application servers 340, 350, and record management server 360. Application servers 340 may host business applications such as, for example, purchasing applications, docketing applications, human resources applications, and so on. Client applications on client terminals allow users of the client terminals to interact with applications hosted on the application servers to create documents which may be saved locally at the server or on remote storage repositories (not shown). Other applications may be used to act as librarians, and receive documents from client terminals that are to be hosted by the application server and provide access control.

The documents controlled by the application servers 340, 350 may be declared as records, under control of the record management server 360. The record management server 360 may be used to implement a file plan object store as shown in FIG. 2 in association with a record management application. As documents come under control of application servers 340, 350, the applications hosted on the servers may request they be declared records by the record management server 360 by, for example, making a call to an API provided by the record management server. In response, the record management server can declare the document to be a record, and classify the record according to a file plan, including a file plan that temporarily defers classification. For records that have deferred classification, the record management application may occasionally query the application servers on the state of the records that have deferred classification to determine if they have become classifiable. Alternatively, the applications hosted on application servers 340, 350 may be designed to automatically update the record management application regarding updates and changes to the records that have deferred classification so that the record management application can determine if the record can be classified. Furthermore, documents created locally on client terminals may be declared as records with deferred classification. A client terminal may include a record management client application for interacting directly with the record management application on record management server 360. Upon creating or receiving a document, a user of a client terminal can notify the record management application to have the document declared a record when the user knows that the document is important, even though the user may not be ready to load the document into a particular system or may not know the proper classification. Furthermore, a user may acquire a physical object which can be stored in location 370, which the user may have declared as a record with deferred classification until more information is acquired.

Records that have deferred classification in accordance with the invention may subsequently be classified upon the occurrence of a classification event. The classification event may be the addition of information to a record, the identification of an application system to which a record is to be loaded, or a default time out period, among other events that may be conceived. Examples of classification events include a lapse of a default time period after being declared a record (when the record may be classified as indeterminate), when information is added to the record either automatically by an application or by a user manually entering the information, upon the recording being associated with another record (and thereby inheriting the associated record's classification), and upon the introduction of a new file plan into which the record may be classified.

Figure 4:
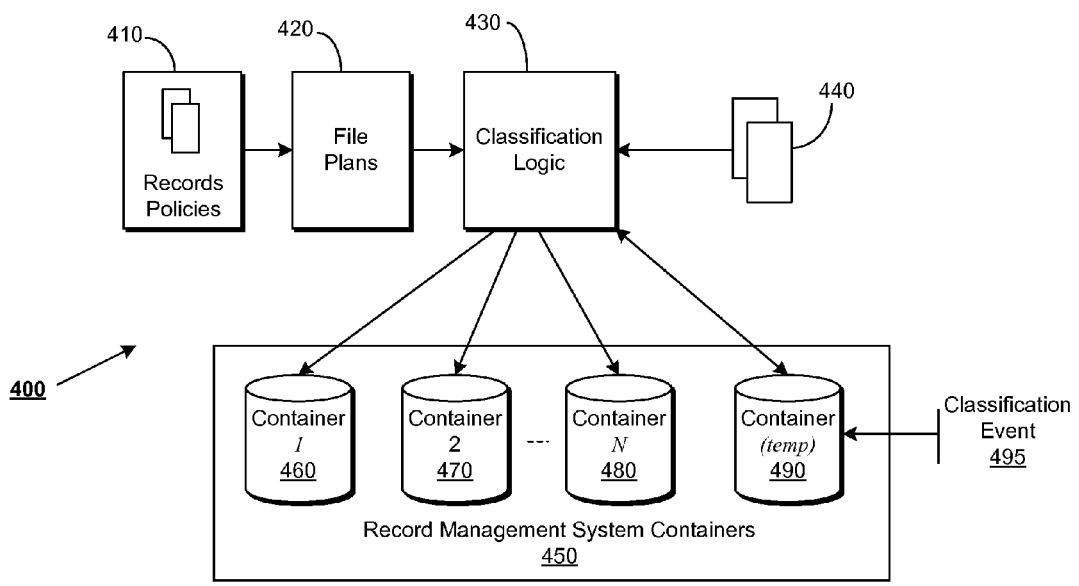
FIG. 4 is a block diagram of records management system for classifying previously declared but not classified records, in accordance with an embodiment of the invention.

FIG. 4 shows a block diagram of records management system 400 for classifying records, including records previously declared but not classified, in accordance with an embodiment of the invention. The records management system 400 may be implemented by an organization to identify and track records as is appropriate. The organization establishes records policies 410 which may be implemented as digital documents and includes settings and identification of various applications in use in the organization that generate record-candidate documents. Accordingly, the records policies themselves may be records. The records policies are used to implement one or more file plans 420, such as that illustrated in FIG. 2. A file plan is used by classification logic 430 of a record management application to declare and classify records, or identify records that require deferred classification.

Accordingly, as documents 440 are presented to the record management application, the documents are declared as records, and then classified by the classification logic 430. As a result, the record management application places each record in an appropriate records container, 460, 470, 480 of record management system containers 450. Records for which classification is deferred are placed into a temporary container 490. By "placed in a container" it is meant that the record management application generates and stores a pointer to the actual document in a file system as indicated in FIG. 2. In that regard the container is a virtual container defined by the record management application as established or directed by a records administrator. Alternatively, it is contemplated that records may be kept locally at the record management server, rather than merely containing pointers, for security considerations, if necessary. Unlike containers 460, 470, and 480, where the records are placed permanently, as indicated by the one-way arrows, the record management application may occasionally check records in the temporary container to see if they can be classified due to the occurrence of some classification event 495 occurring to one or more of the records in the temporary container. When a record in the temporary container becomes classifiable, the record management application then moves the record to the appropriate container for disposition. The classification of a record in the temporary container may be performed in response to various criteria, such as immediately in response to the classification event, at the end of some period of time, or in response to an instruction to attempt to classify records in the temporary container from a records administrator.

Figure 5:
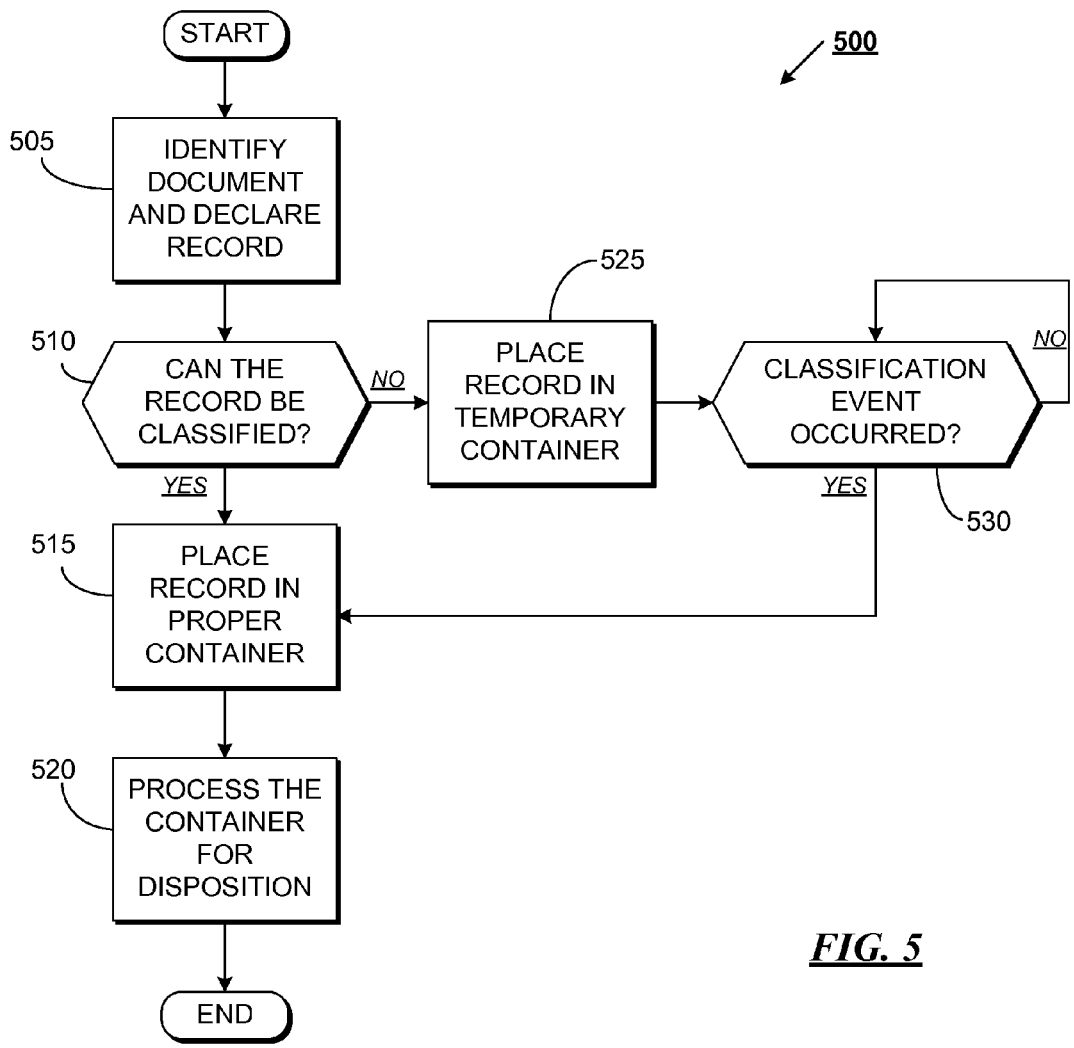
FIG. 5 is a flow chart diagram of a method of declaring records without classifying them upon declaration, and classifying them in response to a subsequent classification event, in accordance with an embodiment of the invention.

FIG. 5 shows a flow chart diagram of a method 500 of declaring records without classifying them upon declaration, and classifying them in response to a subsequent classification event, in accordance with an embodiment of the invention. The method is performed by computer machines arranged and configured appropriately to execute instruction code designed in accordance with the inventive arrangements and principles disclosed herein. Upon the start of the method, one or more documents or objects have been identified and declared (505). The method commences to determine if each declared record can be classified according to a file plan (510). Records that can be classified are then placed in a container corresponding to their classification (515) and aggregated with other records with the same classification. The record management system then dispositions records in each container in accordance with the file plan (520). When a record is declared but cannot be classified or classification is deferred, the record management system places the record into a temporary container (525). The record remains in the temporary container until a classification event has occurred (530). The record management system may occasionally check the status of records in the temporary container. As a plurality of records is aggregated into each container, the record management system may disposition them in bulk. That is, commonly classified records may be dispositioned together at once by the record management system.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A computer program product comprising a tangible computer readable storage medium having computer program code embodied therewith, the computer program code that is stored in a tangible medium comprising:
   computer program code configured to receive a document for entry into a records management system and determine a presence of information sufficient to classify the document within a record category of the records management system, wherein the records management system includes a plurality of record containers each associated with a corresponding record category of a file plan and manages declared records in accordance with policies associated with one or more file plans;
   computer program code configured to declare the document as a declared record of the records management system and to determine that the declared record has an indeterminate classification due to insufficient information for classification of the record into a record category of the records management system;
   computer program code configured to defer classification of the declared record;
   computer program code configured to place the declared record in a temporary container associated with a file plan of the records management system;
   computer program code configured to determine the occurrence of a classification event associated with the declared record subsequent to placing the declared record in the temporary container;
   computer program code configured to, upon the occurrence of the classification event:
      check the declared record to determine that the declared record is configured to be classified within the records management system due to the occurrence of the classification event;
      determine a classification of the declared record within the records management system in response to the record being configured to be classified; and
      place the declared record in a record container corresponding to the classification.

2. The computer program product of claim 1, further comprising:
   computer program code configured to aggregate a plurality of declared records in a container after determining a common classification for each of the plurality of declared records; and
   computer program code configured to enable disposition of the plurality of declared records at once.

3. The computer program product of claim 1, wherein the classification event is one of a lapse of a default time period, adding information to the declared record after placing the declared record into the temporary container, introducing a file plan policy applied to the declared record, and associating the declared record with another record.

4. The computer program product of claim 1, wherein the classification event is introducing a file plan policy applied to the declared record.

5. The computer program product of claim 1, wherein the computer program code configured to check the declared record and determine the classification executes immediately in response to the classification event.

6. The computer program product of claim 1, wherein the computer program code configured to check the declared record and determine the classification executes at a periodic interval of time.

7. The computer program product of claim 1, wherein the computer program code configured to check the declared record and determine the classification executes in response to an instruction to attempt to classify the declared record.

8. A computer implemented records management system including a processor which executes programming code to:
   receive a document for entry into the records management system and determine a presence of information sufficient to classify the document within a record category of the records management system, wherein the records management system includes a plurality of record containers each associated with a corresponding record category of a file plan and manages declared records in accordance with policies associated with one or more file plans;
   declare the document as a declared record of the records management system and determine that the declared record has an indeterminate classification due to insufficient information for classification of the record into a record category of the records management system;
   defer classification of the declared record;
   place the declared record in a temporary container associated with a file plan of the records management system;
   determine the occurrence of a classification event associated with the declared record subsequent to placing the declared record in the temporary container;
   upon the occurrence of the classification event:
      check the declared record to determine that the declared record is configured to be classified within the records management system due to the occurrence of the classification event;
      determine a classification of the declared record within the records management system in response to the declared record being configured to be classified; and
      place the declared record in a record container corresponding to the classification.

9. The computer implemented records management system of claim 8, wherein the classification event is one of a lapse of a default time period, information being added to the declared record after placing the declared record into the temporary container, introduction of a file plan policy applied to the declared record, and an association of the declared record with another record.

10. The computer implemented records management system of claim 8, wherein the records management system further:
   aggregates a plurality of declared records in a container after determining a common classification for each of the plurality of declared records; and
   dispositions the plurality of declared records at once.

11. A computer program product comprising a tangible computer readable storage medium having computer program code embodied therewith, the computer program code that is stored in a tangible medium comprising:
- computer program code configured to receive documents for entry into a records management system and determine a presence of information sufficient to classify the documents within record categories of the records management system, wherein the records management system includes a plurality of record containers each associated with a corresponding record category of a file plan and manages declared records in accordance with policies associated with one or more file plans;
- computer program code configured to declare the documents as declared records of the records management system and to determine that the declared records have an indeterminate classification due to insufficient information for classification of the records into record categories of the records management system;
- computer program code configured to place the records in an unclassified records directory of a file plan repository of the records management system;
- computer program code configured to determine the occurrence of a classification event associated with at least one of the declared records;
- computer program code configured to, in response to the classification event:
  - check the at least one declared record to determine that the at least one declared record is configured to be classified within the records management system due to the occurrence of the classification event; and
  - determine a classification of the at least one declared record within the records management system in response to the at least one declared record being configured to be classified; and
- computer program code configured to, upon determining the record classification, move the at least one declared record to a classification container of the file plan repository corresponding to the classification.

12. The computer program product of claim 11 wherein:
- the classification event is one of a lapse of a default time period, adding information to the at least one declared record, associating the at least one declared record with another record, and introducing a file plan policy applied to the at least one declared record; and
- the checking the at least one declared record and determining the classification occurs by one of:
  - being performed immediately in response to the classification event, being performed at a periodic interval of time, and being performed in response to an instruction to attempt to classify the at least one declared record.

* * * * *